J. L. Mott,
Bath Tub.
No. 322. Reissued Aug. 14, 1855.
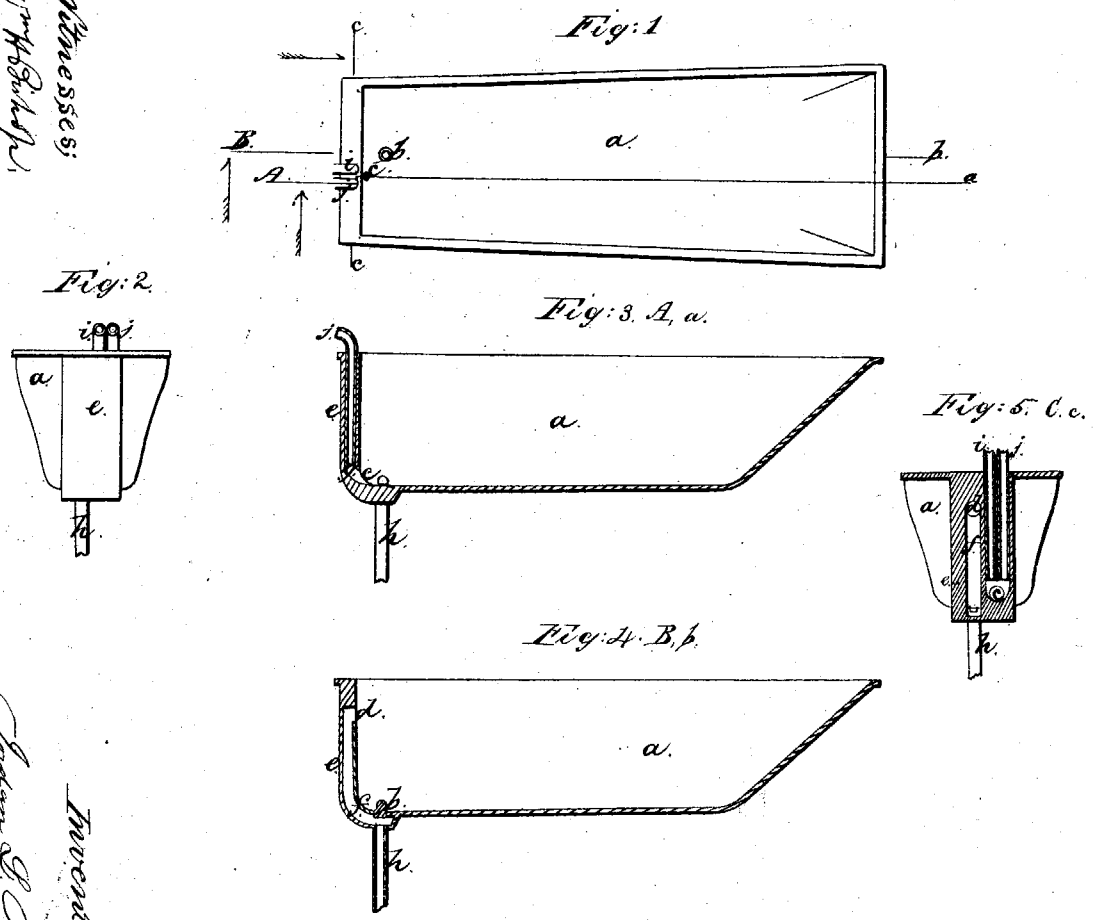
Witnesses;
Wm H Bishop,
Andrew De Lacy.
Inventor;
Indan L. Mott.
N. PETERS, PHOTO-LITHOGRAPHER, WASHINGTON, D. C.

UNITED STATES PATENT OFFICE.

J. L. MOTT, OF WEST HAVEN, NEW YORK.

IMPROVEMENT IN BATHING TUBS.

Specification forming part of Letters Patent No. 10,049, dated September 27, 1853; Reissue No. 322, dated August 14, 1885.

*To all whom it may concern:*

Be it known that I, JORDAN L. MOTT, of Mott Haven, Westchester county and State of New York, have invented certain new and useful Improvements in Bathing-Tubs, of which the following is a full, clear, and exact description, reference being had to the accompanying drawings, making part of this specification, in which—

Figure 1 is a plan; Fig. 2, an end elevation; Figs. 3 and 4, longitudial vertical sections taken at the lines A *a* and B *b* of Fig. 1; Fig. 5, a cross-section taken at the line C *c* of Fig. 1.

Same letters indicate like parts in all the figures.

Heretofore, in making and mounting bathing tubs and other vessels the practice has been to employ a separate tube to prevent the overflow, which tube is at its lower end fitted to a hollow stopper to insert in the hole of the discharge-tube, which hole, when the tub is not in use, is usually closed with a blank or solid stopper, as in such cases the overflow-tube requires to be inserted before filling the tub, it often happens that the insertion of the tube is neglected, and that the water in consequence overflows and does serious injury to the house, and, besides, this tube, being a separate thing and located between the feet of the bather, is liable to injury. Another plan has been to have an external compound standing-pipe connected with the bottom of the tube by means of a branch pipe, so arranged as to admit hot and cold water vertically by one aperture through the bottom of the bathing-tub. There is a separate overflow-pipe connected at its upper and lower ends with this compound standing-pipe. A valve placed within the compound pipe between the upper and lower connections of the overflow-pipe, and below the point of connection of the branch pipe which connects all with the tub, controls the discharge of water from the tub. When the valve is closed, the water rises in the compound pipe, and the surplus is discharged through the overflow. When the valve is open, the contents will run off through the compound pipe. This plan is objectionable for the following reasons: First, if the water be let into the tub vertically, if there be a heavy head, as with the Croton in New York, it may splash over the sides of the tub, if not against the ceiling of the room; second; too complicated, its many connections require a skillful workman to fit and arrange the apparatus for use. It is desirable that the cold and hot water be introduced horizontally, or nearly so, at or near the bottom of the tub and near to each other, not only to insure the proper admixture of the cold and hot water and to have the whole of a uniform temperature, which is difficult to obtain when the water is supplied from the top, but, what is also very desirable to avoid, splashing and noise. To obtain these objects, the cold and hot water pipes have been coupled to the tub at or near the bottom; but this, as heretofore practiced, has been attended with considerable difficulty. In most localities it is difficult to get at the couplings to fit and unite them. The tub or other vessel cannot be moved without disconnecting the pipes. Whenever the tub or the pipes require to be repaired or renewed, they must be disconnected and reconnected, requiring at all times the plumber, which is attended with delay, inconvenience, and expense. If, to avoid this, the supply-pipes are carried down inside the tub to or near the bottom, they are in the way, form lodgment for dirt, and are liable to be deranged. In consequence of these inconveniences, the objectionable mode of supplying the water from above has been generally preferred.

The object of my invention is to avoid the above-enumerated objections to the use of a separate overflow-pipe, as heretofore used, and to produce an apparatus in which the hot and cold water are supplied together horizontally and near the bottom, and without the necessity of coupling the hot and cold water pipes to the vessel, thus avoiding the serious difficulties heretofore experienced.

The nature of my invention consists in casting or otherwise forming the end or side of the vessel, or otherwise fitting to the vessel, and when fitted thereto making a part thereof, a projection or pipe extending from near the upper edge of the vessel down to the bottom, and constituting one or more waterways, one of which extends from a hole opening horizontally, or nearly so, through to the inside of the vessel, and at or near the bottom thereof, to or near the upper edge and open at top, in which are to be loosely or otherwise inserted the supply-pipes, and the other extending from the waste-hole at the bottom and above the coupling of the vessel with the discharge or waste pipe, and connecting with an overflow-hole near the top, so that when the water reaches a certain height in the vessel it shall escape to and through the waste-pipe without being subject to accidents by neglect, by means of which the necessity for more than one coupling with, or attachment to, the discharge or waste-pipe is avoided, as also the necessity for a coupling to the supply-pipes.

In the accompanying drawings, *a* re presents a bath-tub as I usually make it, cast in one piece, with the waste-hole *b* at the bottom to which is to be fitted a stopper in the usual way. A hole, *c*, near the bottom, for the admission of cold and hot water, or either, and *d* a hole near the top, called the "overflow-hole," for the escape of the surplus water after it reaches a certain elevation in the tub, and to prevent the water from overflowing. The tub is cast with a projection, *e*, at the end, which, as represented, extends from the upper edge or flange of the tub and down to and under the bottom a little beyond the waste-hole *b*. This projection is formed with two channels, *f* and *g*. The one, *f*, connects together the overflow-hole *d* and the waste-hole *b*, so that when the waste-hole *b* is closed and the water rises in the tub to the hole *d* the surplus shall pass through this hole down the channel or water-way and out through the waste-pipe *h*, coupled to a hole in the bottom of the said projection *e*. By this means it will be perceived that the tub can never overflow, except by intentionally closing up the waste-hole or water-way. The channel *g* extends from the upper edge of the said projection *e* to the supply-hole *c*, and is made of sufficient capacity for the insertion of the ends of the cold and hot water pipes *i* and *j*, which are provided with stop cocks in any desired manner above the tub.

By this means the water is supplied at or near the bottom of the tub, and in such manner that they mingle together in flowing in. The pipes are entirely out of the way, and all fitting and attaching to the tub is avoided.

In molding for casting the tub, the channels are formed by cores properly inserted in the mold.

Instead of casting the tub with the projection *e* and its channels, such channels and holes can be fitted and secured by flanges and bolts, or screws, or otherwise, to any suitable tub or other vessel; but I prefer to cast the whole in one piece, as it avoids the necessity of making close and tight joints and the liability to leakage.

I do not limit myself to any particular form for the projection *e*, or to its locality, nor to the forms of the channels therein, as these may be varied at pleasure, provided the connection be above the coupling with the discharge or waste pipe, although I prefer to make the whole as above described. Nor do I wish to limit myself to the making of the two channels in one and the same projection, as they may be made each in a separate projection and located at different parts of the tub. Nor, finally, do I wish to limit myself to the use of the two channels in combination, as the use of either one of them will greatly improve the vessel.

I do not claim, broadly, as of my invention the connection of the hot and cold water pipes of a vessel so as to discharge hot and cold water together, as this has before been done by a pipe or pipes coupled with the bottom of the vessel and discharging upward. Nor do I claim, broadly, the use of an overflow-pipe for carrying off the water and preventing the water in the tub from overflowing, as a separate device has before been used for this purpose; but when so used it was so connected with the waste and supply pipes as to necessitate the use of a valve within the waste-pipe or a double coupling therewith, together with all its attendant disadvantages; and although I have described my said improvements in connection with and as applied to a bath-tub, it will be obvious from the foregoing that they are equally applicable to other and analogous vessels—such as wash-basins, wash tubs or vats, sinks for kitchens, &c.

What I do claim as my invention, and desire to secure by Letters Patent, is—

The before described mode of combining with a bathing-tub or other like vessel, either one or both of the channel-ways, substantially as described, and making, when constructed, part of the tub or vessel, one of which channel-ways connects the overflow and waste or discharge holes with the waste-pipe, and the other channel-way is adapted to the insertion of the hot and cold water pipes, and discharging the hot and cold water together at or near the bottom of the vessel and in a horizontal or nearly horizontal direction, substantially in the manner and for the purpose specified.

JORDAN L. MOTT.

Witnesses:
WM. H. BISHOP,
ANDREW DE LACY.